UNITED STATES PATENT OFFICE.

CARLETON ELLIS, OF MONTCLAIR, NEW JERSEY.

PROCESS OF MAKING CATALYZERS.

1,390,683.  Specification of Letters Patent.  Patented Sept. 13, 1921.

No Drawing.  Application filed December 12, 1916. Serial No. 136,472.

*To all whom it may concern:*

Be it known that I, CARLETON ELLIS, a citizen of the United States, and a resident of Montclair, in the county of Essex and State of New Jersey, have invented certain new and useful Improvements in Processes of Making Catalyzers, of which the following is a specification.

This invention relates to a method of making catalysts adapted for oil hydrogenation and to a catalytic product comprising catalytic material more particularly of a pyrophoric nature sealed and bonded by a fusible organic body preferably of an inert character such as a hydrocarbon of the nature of paraffin.

This application has derivation in several of my copending applications to wit Serial No. 808,461 filed Dec. 23, 1913, Serial No. 817,041 filed Feb. 6, 1914, and Serial No. 123,416 filed Oct. 2, 1916, a division of No. 808,461.

In Serial No. 808,461 (page 13) I have indicated that in the case of pyrophoric air-unstable finely-divided metallic catalyzer such as reduced nickel in its various forms I may mix a mass of such catalyzer with a sealing and binding agent such as oil or hydrogenated fat intimately incorporated therewith to form a cake or mass of catalytic material fairly well sealed from the air by the fatty envelop and may further improve the stability of the catalytic mass by dipping the cake in a bath of paraffin or other wax of similar material so as to form a coating of the wax over the surface of the cake and thus more completely exclude air.

In Serial No. 808,461, (pages 13–14) it is also stated that the following matter is derived from Serial No. 748,532, filed Feb. 15, 1913.

"The process permits of preparing pyrophoric catalyzer in a state which enables its handling on the large scale without danger. This stable form is secured by incorporation of the catalyzer with oil or wax or hydrogenated fatty material preferably quite hard. The catalyzer may for example be mixed with just sufficient melted hydrogenated oil, preferably vegetable oil, to seal and cement or bond the particles of catalyzer into a solid mass such as blocks or cakes. When cold these if desired may be dipped momentarily into a bath of melted paraffin or ceresin and the like, to form an outer seal, and the catalyzer may be preserved or shipped in this condition; thus affording as a new article of manufacture a catalyzer normally pyrophoric but rendered factitiously stable through an incorporated sealing and bonding agent.

"A catalyzer of the charcoal-nickel type comprising say one part of reduced nickel to four or five parts of charcoal of about 60-80 mesh and having the charcoal charged with occluded hydrogen (especially that derived by the supercharged product obtained by reduction under pressure of the reducing medium) has, when sealed as above, most excellent keeping qualities, as the store or magazine of hydrogen carried by the charcoal, tends to keep the mass under reducing conditions and serves as a protector for the easily-oxidized reduced metal. When vegetable or other hydrogenated oil is affected by the catalyzer causing formation of metal soaps, etc., the hydrogenated oil sealing and bonding agent may be replaced by paraffin wax or other inert sealing agent."

In Serial No. 817,041 filed February 6, 1914 (now Patent 1,251,202) the application of nickel carbonyl for producing metallic nickel catalyzer is described and it is stated that the vapors thereof may be passed into a decomposing apparatus in which a body of heated oil is kept in motion by stirrers, in order to effect the decomposition of the carbonyl and form the catalyzer, and that various oils may be used in this operation; the employment of mineral oil being indicated. The oil employed is kept at a temperature of about 180–200° C. or at such temperature as will bring about efficient decomposition and formation of catalyzer.

When the oil has been sufficiently charged with nickel so that it has one-fourth or one-half of one per cent. or more of nickel material, hydrogen may be admitted, if desired, and the oil hardened. Inasmuch, however, as by the present invention it is more particularly the object to prepare catalytic material, the nickel carbonyl is passed into the oil continuously or intermittently for a sufficient period until the oil is more concentrated in precipitated nickel. Thus, oil containing 5, 10, 15, 25 or 50% or so of nickel may be obtained and the oily mass carrying this precipitated metal may be added as desired to a sufficient quantity of oil in suitable treating apparatus so as to introduce one-fourth, or one-half of one per cent. or so of this catalyzer as desired and the oil hydrogenated under proper thermal conditions.

Thus a catalyzer is prepared by concentrating precipitated nickel in a body of oil and a new article of manufacture is thereby obtained, namely, finely-divided nickel precipitated from a nickel compound by thermal decomposition in a body of oil which precipitated metal is sealed from the air by the presence of the oil, and because of the viscosity or other properties of the oily material, the nickel does not precipitate in a gross or coarse form in which it would be less active. On the other hand, it is undesirable to precipitate under such conditions that the oil is charged with particles of nickel which cannot be filtered very readily unless it is desired to obtain a colloidal condition and due allowance made therefor in subsequent treatment.

By decomposing the nickel carbonyl in a relatively small body of oil and then mixing with a large body of oil a control over the size of grain or character of the precipitation may be had to a considerable measure in some cases and this is of importance in connection with the subsequent operations of filtration. By decomposing the nickel carbonyl at different temperatures, catalyzers of varying activity and filtering properties may be obtained and hence the desirability of preparing the catalyzer in a small body of oil and subsequently transferring same to a larger body of oil.

If the oil in which the nickel carbonyl is decomposed is not one which should be added in large quantities to the oil to be hydrogenated, as for instance if a fatty oil is to be hydrogenated and the catalyzer has been prepared in a petroleum oil, the precipitated nickel in the small body of petroleum oil may be filtered to remove the oil as much as possible, or in fact the oil may be extracted by volatile solvents if desired and the nickel material then added to the oil which is to be hydrogenated.

In the same way, various other organic nickel compounds capable of being decomposed by heat, with or without the addition of hydrogen (including nickel formate, acetate, oleate, and the like) may be treated while dissolved or suspended in a hydrocarbon material such as paraffin wax or similar inert vehicle. The process may also be applied to the organic compounds of copper, iron, cobalt, and the like to produce catalytic bodies suspended in or sealed by an inert oily vehicle of the nature of hydrocarbon oil or of a wax such as mineral wax.

A salt of the nature of nickel formate may be employed with paraffin or ceresin wax and heated to somewhat above 200°, preferably between 230 and 240° C., whereby decomposition takes place resulting in the formation of nickel material suitable as a catalyst inclosed or ensealed by the paraffin wax which of course at the temperature of operation is in a molten condition and on cooling solidifies forming a solid cake of the catalytic material embedded in wax. If it is found necessary to employ a considerable proportion of wax to secure the proper mobility of the nickel suspension, after reduction is complete the mass may be pressed or filtered to remove any excess of this material, or the wax may be practically entirely removed by extraction with benzol or other similar solvent. Decomposition of the nickel formate or analogous substances may take place under decreased pressure and if desired in the presence of a reducing gas such as hydrogen.

Nickel oxalate (normal or neutral) is a peculiar salt in that each molecule thereof might be considered as being made up of two molecules of carbon dioxid and one atom of nickel and thus this compound differs from all other organic salts of nickel. In fact, just as nickel carbonyl is a compound of nickel and carbon monoxid, so nickel oxalate may similarly be considered for purposes of comparison, as a compound of nickel and carbon dioxid. On heating it breaks down yielding hydrogen-free gases. If the conditions are such as to form metallic nickel and carbon dioxid only, the gas may best be removed from the vehicle by operating under diminished pressure and in fact the removal of the carbon dioxid as such from the oxalate during its decomposition is facilitated by reduction of pressure. The oxalate may also be reduced in the presence of a reducing gas such as hydrogen. In preparing this material for reduction, I prefer to grind the oxalate with molten paraffin to secure an intimate incorporation and subsequently heat this mixture when reduction will take place to better advantage than when nickel oxalate is reduced in the form of lumps or coarse granules. The oxalate may be in the form of the acid, neutral or basic salt as desired.

The use of a solid reducing agent such as hydrazin or its hydrate, hydroxylamin, etc., or certain aldehydes and the like is not precluded in carrying out the process of the present invention and such reducing agents as also glucose and similar bodies may be employed under some conditions as adjuncts.

Other compounds which may have application in the present field are copper and nickel acetylids. Copper acetylid, formed by treating an ammoniacal solution of cuprous chlorid with acetylene, decomposes at a relatively low temperature when heated. It may be mixed with a fatty oil, or preferably with an inert vehicle such as molten paraffin and heated until the reaction is complete. Nickel acetylid may be handled similarly, as also composite acetylids such as copper-nickel or silver-nickel acetylids.

Nickelous cyanid likewise may be employed, especially the freshly precipitated product, in hydrated or dehydrated form.

To recapitulate, the preferred form of my present invention relates to a process of making catalyst particularly a sealed catalyst adapted for the hydrogenation of fatty oils and the like containing unsaturated components. The process involves subjecting a potentially catalytic substance such as nickel carbonyl, nickel formate, acetate, propionate, lactate, oxalate, oleate, stearate benzoate and similar organic compounds or salts of nickel, or of other catalytic metal such as copper, cobalt, iron and the like to reducing conditions as by heating to a decomposing temperature, which if desired, may be carried out in the presence of a reducing gas such as hydrogen and the like, in the presence of a bathing or suspensory vehicle or medium such as a hydrocarbon oil or paraffin wax or similar inert bodies which are not readily acted upon by moisture in the presence of nickel or similar bodies to yield saponifiable products such as would be obtained when reducing in a vehicle of the nature of fatty oil, thereby enabling the catalytic body to be prepared in a state of purity substantially unaffected by decomposition products that may be formed from glycerids and the like, when used under similar conditions; whereby a finely-divided highly active catalytic material is obtained which may be pressed and formed into solid cakes or blocks by cooling down the vehicle which has been maintained in a molten condition by the heat treatment. The aforesaid vehicle is preferably a solid at ordinary temperatures. With a vehicle liquid at room temperature, a paste may be derived charged with catalytic metal and constituting a concentrate which may be added in larger or smaller portions to an oil that is to be hydrogenated and the hydrogenating process carried out thereon, or if desired, the inert sealing medium may be removed by extraction with a solvent or in any other suitable manner leaving the catalyzer free or more or less free from such sealing envelop when the catalytic body may be used for hydrogenation purposes as desired.

My invention further contemplates the product of such process, namely, catalytic material of the character described embedded in a sealing or binding agent of a character substantially unaffecting the nature of the catalyzer by contact therewith, thereby enabling catalytic material prepared by said process to be stored for reasonably long periods of time or to be shipped long distances without any substantial deterioration. Among the advantages of the process may be mentioned the relatively low temperature of reduction, the fact that the reducing step can be carried out with simple apparatus such as a jacketed kettle provided with an agitator. Any water which is formed by the decomposition does not materially affect the hydrocarbon compound and does not act as in some cases it affects a glycerid, to bring about saponification with liberation of fatty acid which in turn may attack the catalyzer.

What I claim is:—

1. The process of making a catalyzer which may be used for the hydrogenation of fatty bodies containing unsaturated components which comprises subjecting a decomposable compound of nickel in paraffin wax to the action of heat in the presence of a reducing gas whereby an active catalytic body is obtained.

2. The process of making a catalyzer which may be used for the hydrogenation of fatty bodies containing unsaturated components which comprises subjecting a decomposable organic compound of a catalytic metal in an inert suspensory medium comprising a hydrocarbon body, to the action of heat in the presence of a reducing gas whereby an active catalytic body is obtained.

3. The process of making a catalyzer which may be used for the hydrogenation of fatty bodies containing unsaturated components which comprises subjecting a decomposable compound of nickel in a molten inert organic suspensory medium solid at ordinary temperatures to the action of heat in the presence of a reducing gas whereby an active catalytic body is obtained.

4. The process of making a catalyzer adapted for the hydrogenation of fatty oils which comprises heating nickel formate to a temperature of about 240° C. in a bathing liquid comprising substantially an organic sealing vehicle, which is inert to hydrogen in the presence of nickel catalyst, at 240° C.

CARLETON ELLIS.